(12) United States Patent
French et al.

(10) Patent No.: US 8,093,533 B2
(45) Date of Patent: Jan. 10, 2012

(54) MODULAR PIZZA OVEN KIT, PIZZA OVEN FINGER ASSEMBLY SUPPORT, AND A METHOD OF OPERATING A PIZZA OVEN AT DIFFERENT SPEEDS AND A CONTROL ARRANGEMENT FOR PERFORMING THE METHOD

(76) Inventors: Michael French, Vanderbilt, PA (US);
Mark A. Bielstein, Connellsville, PA (US)

( * ) Notice: Subject to any disclaimer, the term of this patent is extended or adjusted under 35 U.S.C. 154(b) by 627 days.

(21) Appl. No.: 12/336,337

(22) Filed: Dec. 16, 2008

(65) Prior Publication Data

US 2009/0184103 A1    Jul. 23, 2009

Related U.S. Application Data

(60) Provisional application No. 61/014,108, filed on Dec. 17, 2007, provisional application No. 61/109,883, filed on Oct. 30, 2008.

(51) Int. Cl.
*F27B 9/06* (2006.01)
*A47J 37/08* (2006.01)

(52) U.S. Cl. ........ 219/388; 219/395; 219/400; 219/392; 219/394; 219/413; 219/492; 219/494; 219/497; 99/386; 99/330; 99/326; 99/337; 99/338

(58) Field of Classification Search .................. 219/388, 219/395, 400, 392, 492, 394, 413, 494, 497; 99/330, 326, 336, 337, 338, 483, 386
See application file for complete search history.

(56) References Cited

U.S. PATENT DOCUMENTS

| 6,933,473 B2 * | 8/2005 | Henke et al. .................. 219/400 |
| 6,998,582 B1 * | 2/2006 | Maroti ........................ 219/451.1 |

\* cited by examiner

*Primary Examiner* — Shawntina Fuqua
(74) *Attorney, Agent, or Firm* — Nils H. Ljungman & Associates

(57) ABSTRACT

A modular pizza oven kit, pizza oven finger assembly support, and a method of operating a pizza oven at different speeds and a control arrangement for performing the method. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

4 Claims, 16 Drawing Sheets

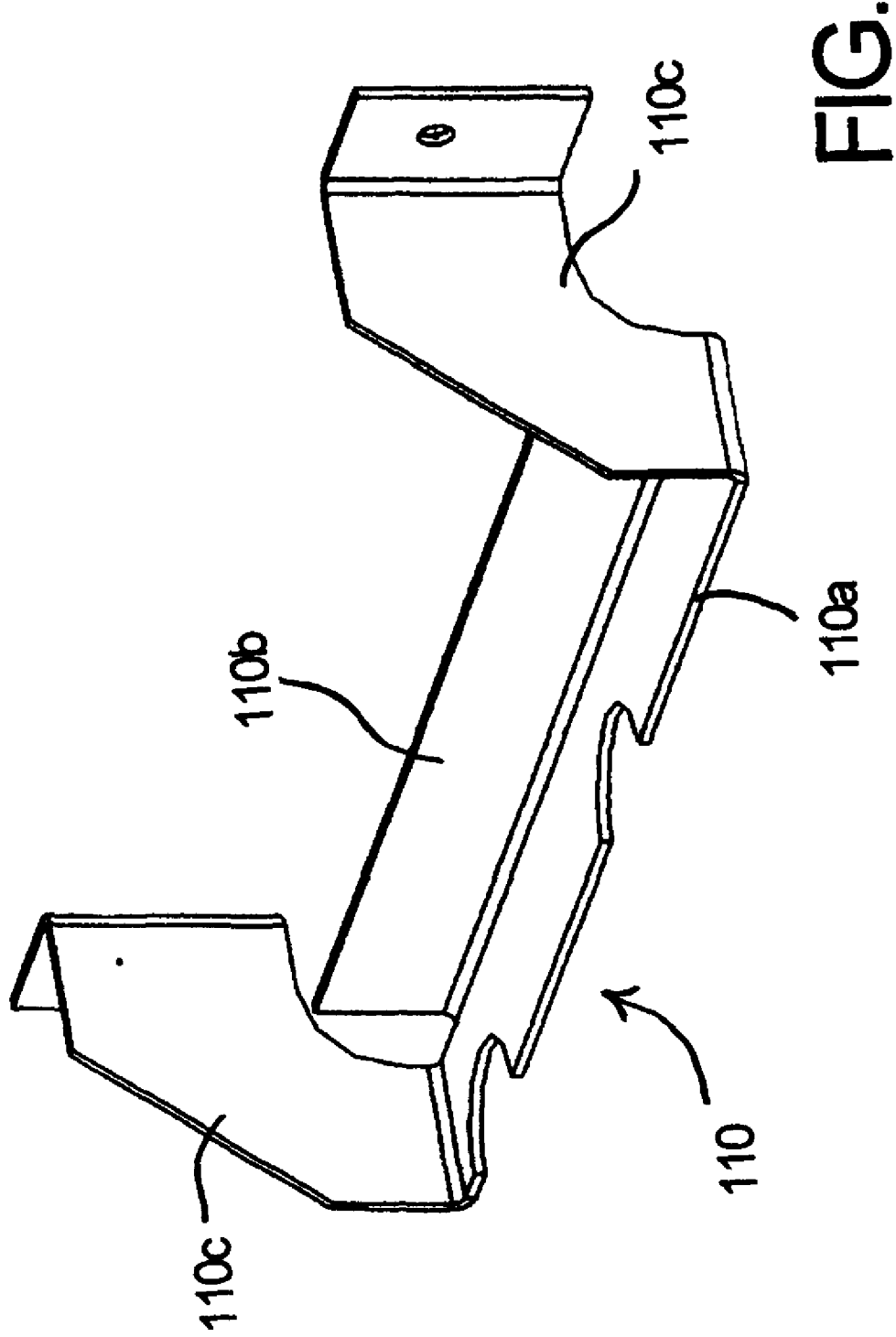

TOP VIEW

BACK VIEW

FRONT
VIEW

SIDE VIEW

TOP VIEW

BACK VIEW

FRONT VIEW

SIDE VIEW

TOP VIEW

BACK VIEW

FRONT VIEW

SIDE VIEW

TOP VIEW

BACK VIEW

FRONT VIEW

SIDE VIEW

TOP VIEW

BACK VIEW

FRONT VIEW

SIDE VIEW

TOP VIEW

BACK VIEW

FRONT VIEW

SIDE VIEW

MODULAR PIZZA OVEN KIT, PIZZA OVEN FINGER ASSEMBLY SUPPORT, AND A METHOD OF OPERATING A PIZZA OVEN AT DIFFERENT SPEEDS AND A CONTROL ARRANGEMENT FOR PERFORMING THE METHOD

BACKGROUND

In general, pizza ovens are constructed as a single unit and are then shipped to the customer. These units are extremely heavy, weighing approximately 1000 pounds, and are large and difficult to handle. Due to the large size and weight, the customer often must hire an installation service which specializes in moving and installing heavy machinery. Such installation can often be difficult and at times dangerous given the confined spaces in which pizza ovens are often installed, such as restaurants or pizza shops, and the bulky size and weight of the oven unit. As a result, there is a high cost of shipping to the customer, as well as the cost of installation.

Such pizza ovens are generally assembled by the manufacturer using riveting, tech screws, and welding, and thus are not easily disassembled. Thus, when repair of the pizza oven is necessary, either the entire pizza oven unit is sent to a repair center, a repair technician comes to the site where the unit is located, or the entire unit is replaced by a new unit. Each of these options has its disadvantages because of the costs involved, such as shipping costs, service call costs, or replacement costs, especially in the instance where only a minor repair is required. In addition, unless the owner of the pizza oven has a backup oven, there is also the cost in lost production time while awaiting the repair or replacement.

Some pizza ovens utilize what are known as fingers or finger assemblies to direct heated air in a bake chamber toward a product be baked. The fingers are elongated, generally rectangular, hollow, box-like structures which are enclosed and have a plurality of holes in one of the elongated sides through which heated air exits. The finger assembly is open on one end, which is placed over a corresponding hole in the oven plenum wall and is to be held tightly against the oven plenum wall portion surrounding the hole. Heated air is conducted through the hole in the plenum wall and into the finger, which air is then forced out of the holes in one of the elongated sides of the finger assembly toward the product being baked. The finger assemblies are often supported using angle iron rails or by a technique of sliding the fingers in along a front rail. This design does not maintain pressure against the finger assembly allowing the outer cover of the finger assembly to slide off the finger housing. When the outer cover is not properly in place on the finger housing the oven does not bake correctly. A large gap sometimes as large as 0.75 inches can be found in the rear of the finger assembly causing a loss of air pressure in the fingers and an uneven bake in the oven. Such designs have room for the housing to move, which allows leaking and loss of some pressure in the finger housing. The reason for leaving the finger housing loose is to allow for expansion and contraction during the heating process. Unfortunately, such movement of the finger housing may cause uneven airflow and pressure, which causes the oven to lose some of its baking efficiency.

Most pizza ovens bake only at one air flow setting and one corresponding conveyor speed. Since the oven is on throughout a normal business day, the same amount of energy is utilized during slower business times when only a few products are being cooked or baked in a given amount of time as is used during faster or peak business times when several or many products are being cooked or baked in a given amount of time.

OBJECT OR OBJECTS

At least one possible object of the present application is to overcome the disadvantages of single unit pizza ovens relating to shipping, installation, and repair, using a pizza oven having a modular design and a kit therefor.

At least one other possible object of the present application is to overcome the disadvantages of finger assembly designs which allow for undesired relative movement between the finger assembly housing and outer cover, and the resulting formation of gaps there between, using a finger holder, rail, or guide according to at least one possible embodiment.

At least one other possible object of the present application is to overcome the disadvantages of pizza oven heating or baking controls which permit only one airflow setting and one corresponding conveyer speed using a method of changing the air flow and conveyor speed and a pizza oven control device for performing the method.

SUMMARY

A modular pizza oven kit according to at least one possible embodiment, pizza oven finger assembly support according to at least one possible embodiment, and a method of operating a pizza oven at different speeds and a control arrangement for performing the method according to at least one possible embodiment.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1:
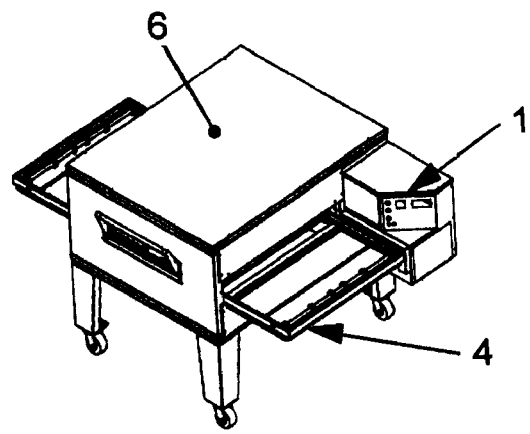
FIGS. 1-3 show at least one possible embodiment of a modular pizza oven.
Figure 2:
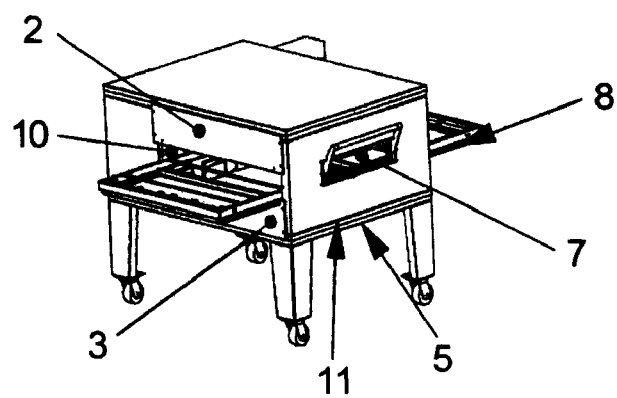
Figure 3:
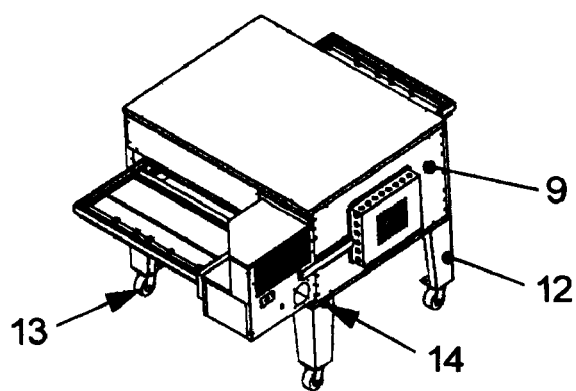

At least one possible embodiment of the modular pizza oven is shown in FIGS. 1-3. A control can assembly 1 houses the operating controls for the oven and the natural gas control devices and burner. An upper end plug 2 closes off the top half of the bake chamber above the conveyor belt. A lower end plug 3 closes off the bottom half of the bake chamber, below the conveyor belt. A conveyor belt 4 runs horizontally through the bake chamber and carries the product through the oven. An oven base 5 supports and insulates the bottom of the oven. An oven lid 6 mounts to the top of the oven, finishes off the oven stack and covers the oven insulation. A half-bake window 7 opens to allow a product to be placed halfway through the oven for half-bake time. A crumb pan 8 is located under both the entrance and exit of the conveyor belt and catches debris that falls through the conveyor belt. A back assembly 9 closes off the back of the bake chamber. A plenum assembly 10 houses the hot air blower motor and fan, as well as thermocouples to monitor hot air temperature. An oven bottom mounts to the top of the oven base, and is used to seal off the stack and cover the oven insulation. Oven legs 12 are used to raise or lower the oven to convenient working heights. Oven casters 13 are used on all oven configurations to allow moving the oven for installation and servicing. Restraining devices 14 secure the oven base to the wall to avoid damage to gas and electrical connections.

Figure 4:
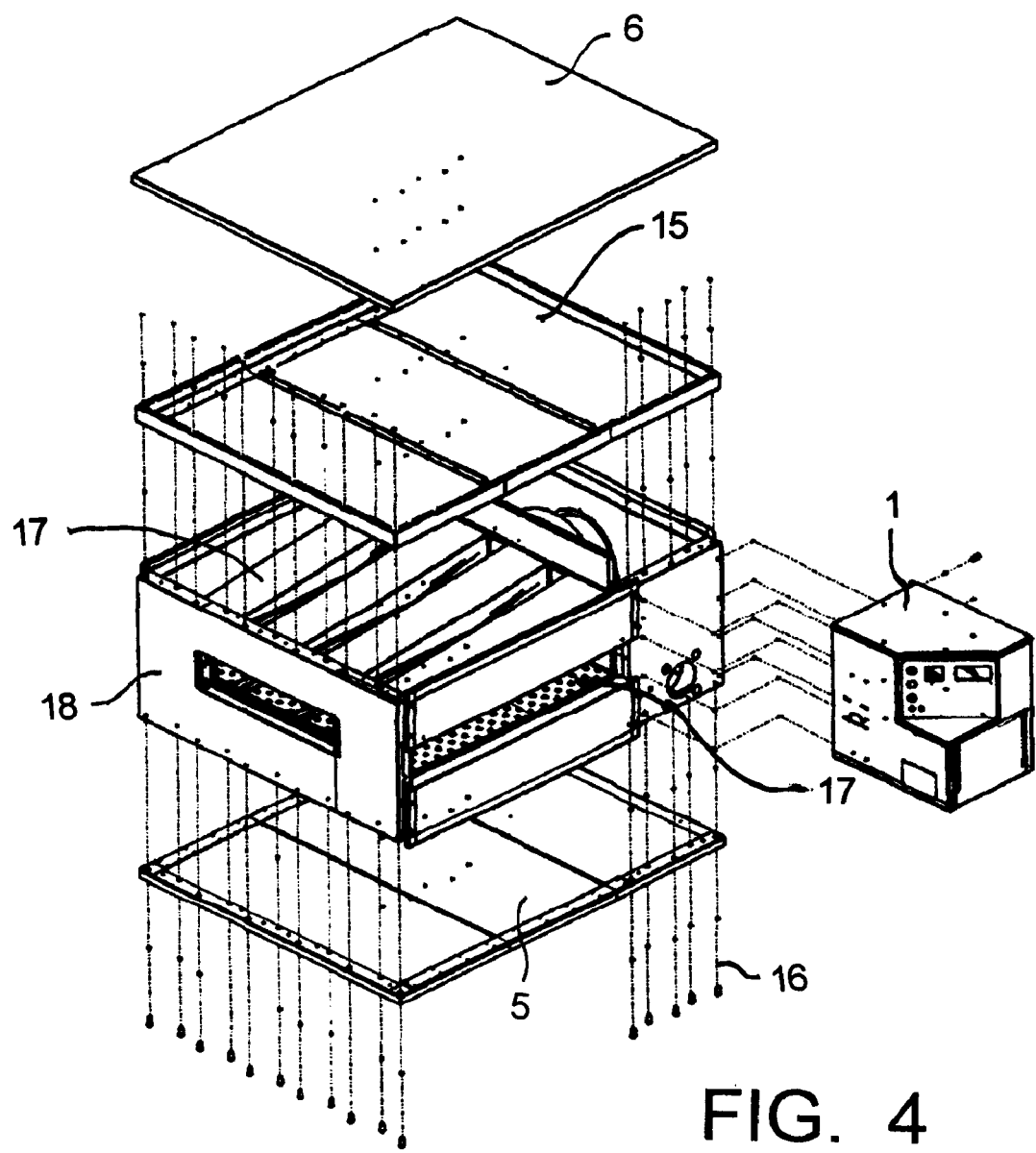
FIG. 4 shows an exploded view of a modular pizza oven in accordance with at least one possible embodiment.

FIG. 4 shows an exploded view of a modular pizza oven in accordance with at least one possible embodiment. The control can 1, the other base 5, and the oven lid 6 our shown. In addition, insulating panel 15, fasteners 16, finger assemblies 17, and bake chamber 18 are shown. The fasteners 16 may be any appropriate fastener, such as bolts or screws. The finger assemblies 17 are located inside the bake chamber 18 and are utilized to guide heated air toward a product being moved through and baked in the baked chamber 18. For shipping, the components of the modular pizza oven may be shipped in separate containers to the customer, which containers, in accordance with at least one possible embodiment, could weigh anywhere in the range of approximately 10 to 70 pounds, which would be considerably less than the approximately 1000 pound weight of a single pizza oven unit. The customer, upon receipt of the components, may assemble and install the oven himself, essentially without the need for specialized lifting and installation equipment necessary for installing an approximately 1000 pound single pizza oven unit. In addition, the customer, upon determining an operating error or malfunction, or decrease in efficient operation of the oven, is able to remove the defective or malfunctioning component and send it to a repair center. Further, the customer could easily store an additional control can 1, so that in the case of a malfunctioning control can 1, the customer can easily replace the malfunctioning unit with the stored replacement unit, thereby minimizing any downtime in production. The malfunctioning control can 1 may then be sent out for repair or discarded.

Figure 6:
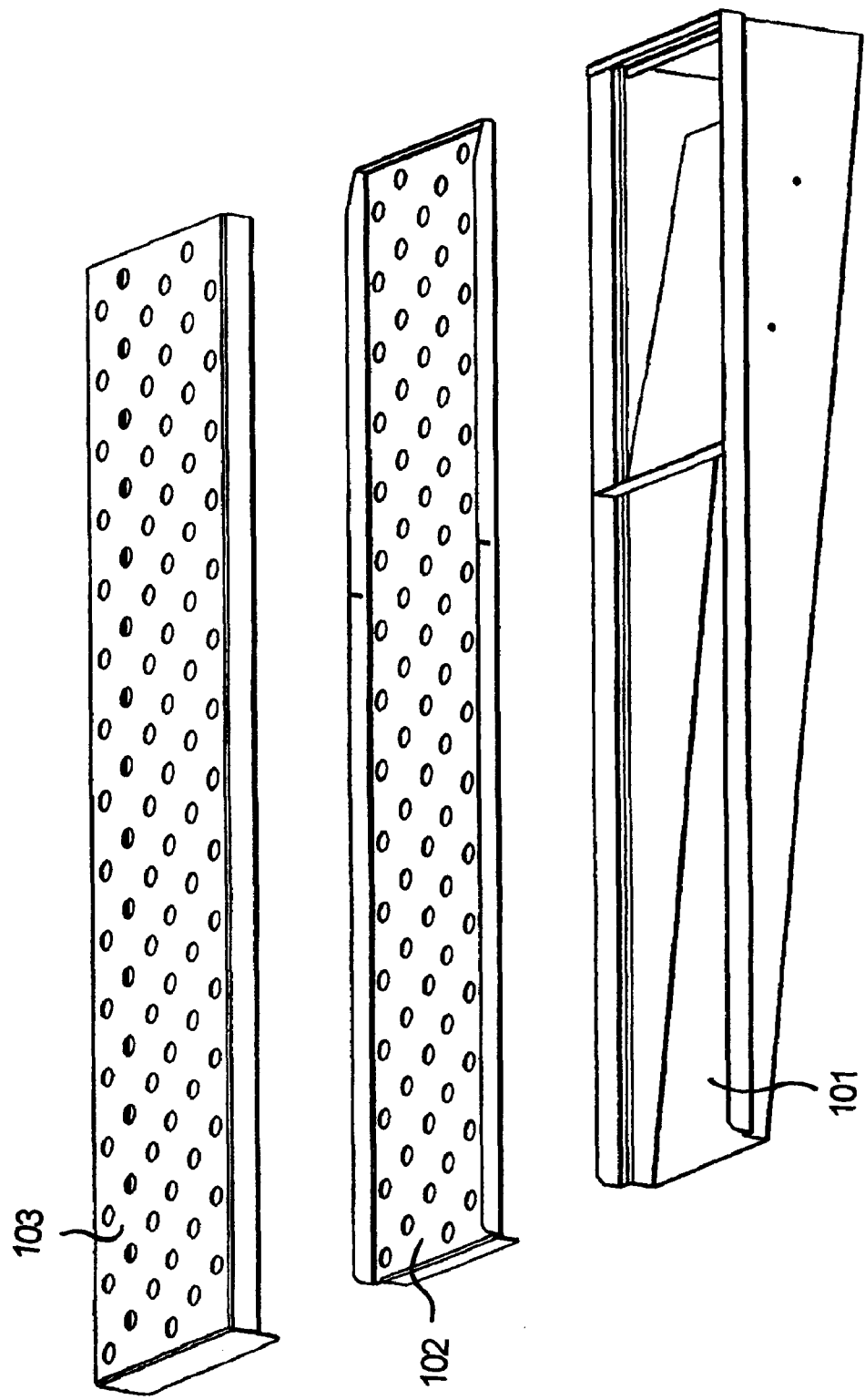
FIG. 6 shows at least one possible embodiment of a finger assembly.

FIG. 6 shows at least one possible embodiment of a finger assembly. The finger assembly comprises a housing 101, an inner panel 102, and an outer cover 103. Upon assembly of these components, the housing 101 and outer cover 103 matingly and sealingly engage with one another to enclose the inner panel 102. However, these components are not fixedly engaged with one another, and can be easily taken apart. The housing 101 and the outer cover 103 may be moved or slid along their length dimensions relative to one another.

Figure 5:
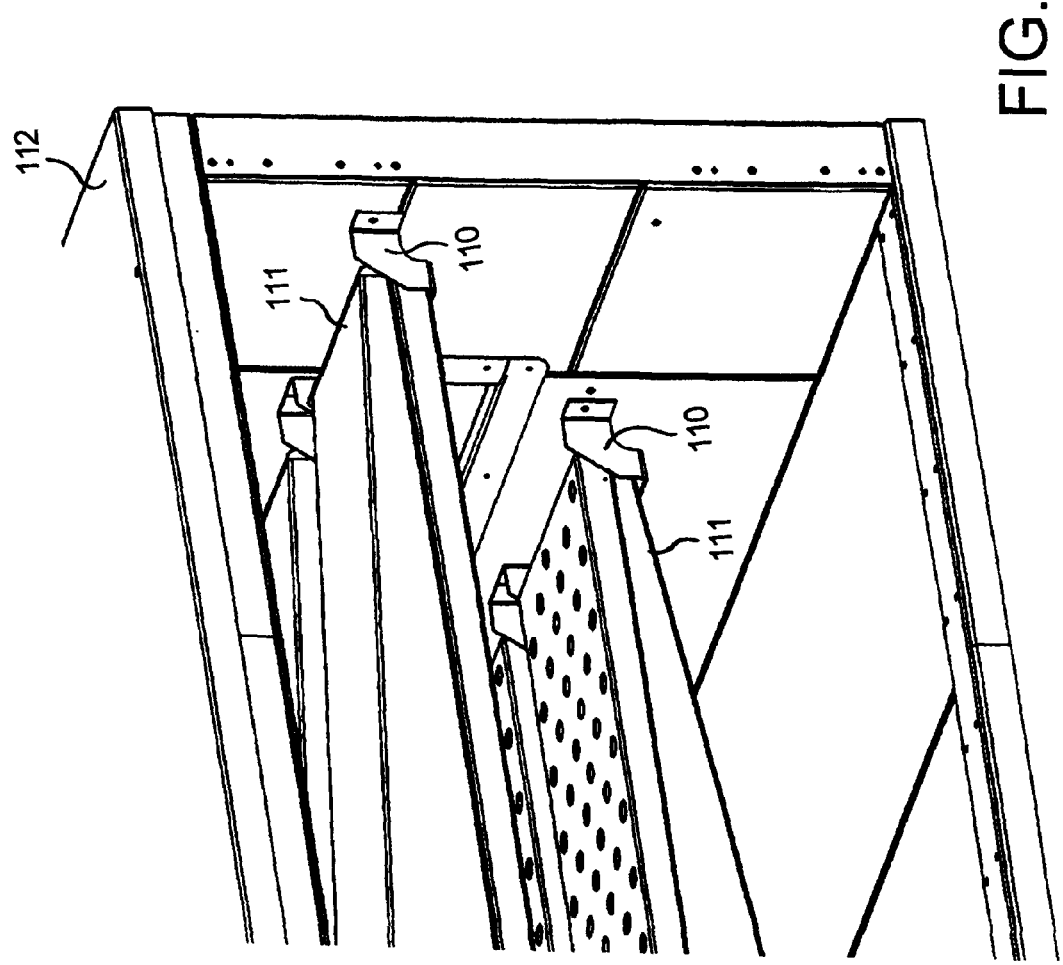
FIG. 5 shows at least one possible embodiment of a finger holder as installed in an oven.

FIG. 5 shows at least one possible embodiment of a finger holder 110 as installed in an oven 112. The finger holder 110 supports a closed, tapered end of an elongated finger assembly 111, which tapered end is disposed opposite a larger, substantially rectangular open end. The finger holder 110, which is shown in greater detail in FIG. 5A, is attached to the wall of the oven 112 by arms 110c of the finger holder 110. The tapered end is supported by support piece 110a, which support piece 110a connects and is substantially perpendicular to the two arms 110c. Connected to the support piece 110a is a flange 110b. The flange 110b is positioned with respect to the support piece 110a at an angle greater or slightly greater than 90°, such as 91°, 92°, 93°, 94°, 95°, 96°, 97°, 98°, 99°, or 100°, as well as tenths of a degree there between. In at least one other possible embodiment, the flange 110b is positioned with respect to the support piece 110a at an angle greater than 100°. To install the finger assembly 111, the open end of the finger assembly 111 is mounted flush against the plenum wall and to surround the opening in the plenum wall through which the heated air is conducted. The tapered end is then lowered and seated in or rested on the finger holder 110. The angular design of the flange 110b results in a pressing force or biasing force being exerted on the finger assembly 111. This pressing force minimizes, restricts, or essentially prevents relative movement between the housing 101 and the outer panel 103, thereby promoting or essentially guaranteeing that the housing 101 and the outer panel 103 form a closed, sealed space. To further explain, the pressing force causes the outer panel 103 to press flush against the plenum wall so that heated air exiting the hole in the plenum wall does not leak or flow through a gap between the outer panel 103 and the plenum wall. As discussed above, such a gap is undesirable as it would allow more heated air to flow into the portion of the oven nearest the plenum wall, resulting in uneven cooking and loss of pressure inside the finger assembly 111. In addition, the finger holder 110 is designed to flex during expansion and contraction of the finger assembly 111 to promote or essentially maintained a positive seal.

Figure 7:
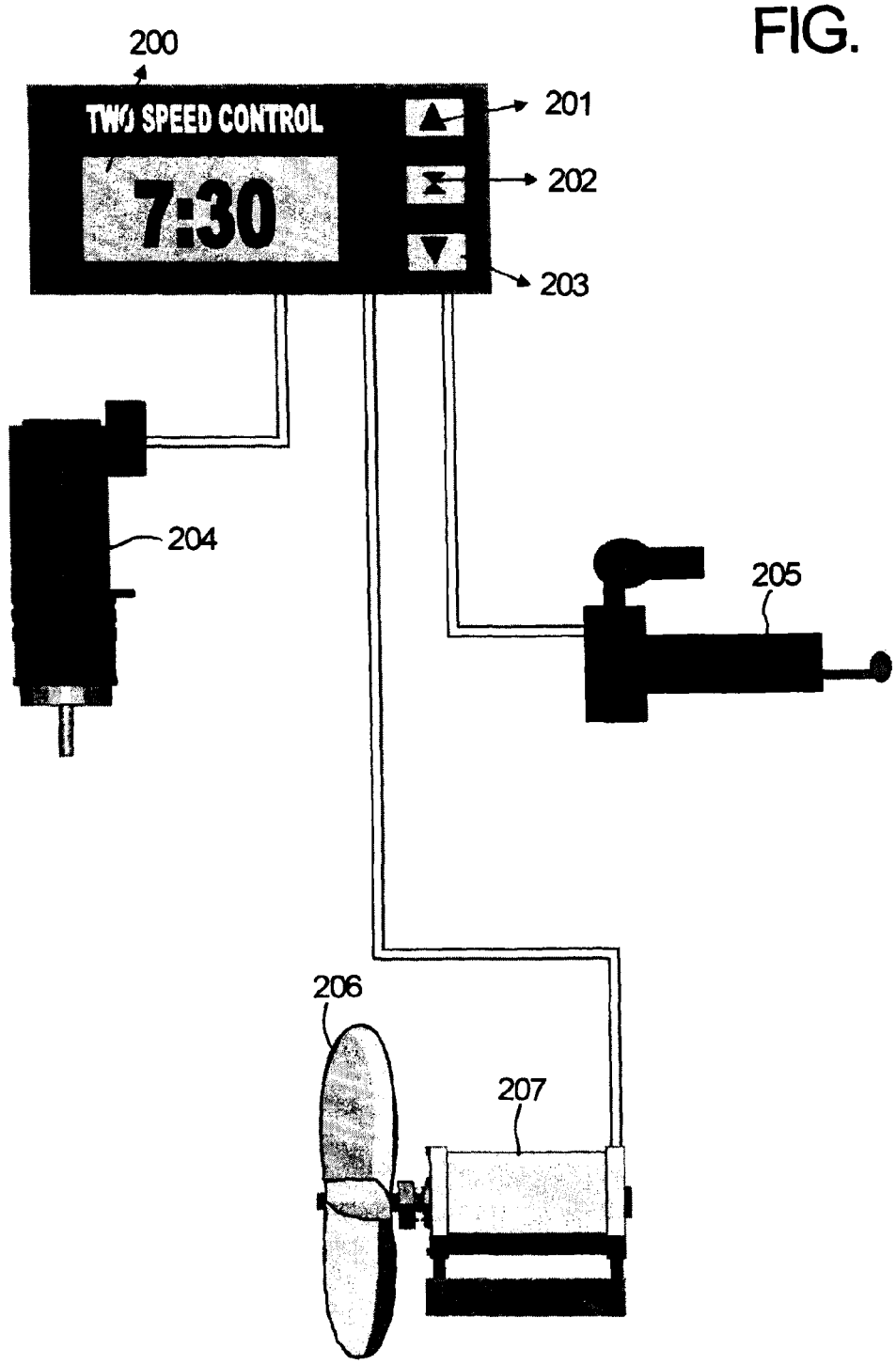
FIG. 7 shows schematically the components of a two-speed control arrangement for a pizza oven in accordance with at least one possible embodiment.
Figure 8A:
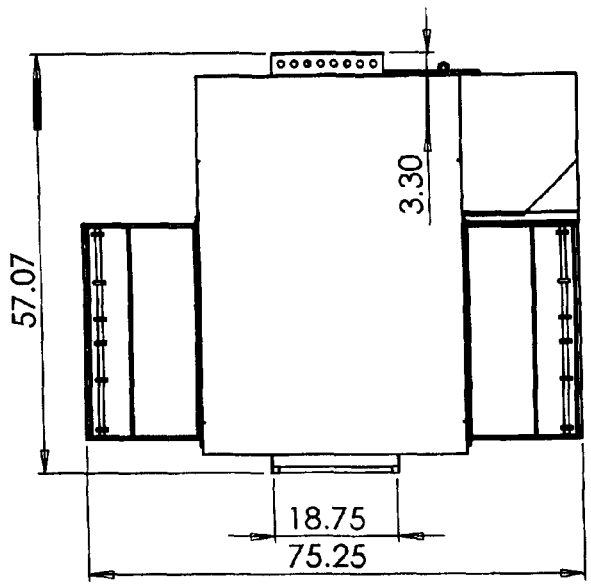
FIGS. 8A-8D, 9A-9D, 10A-10D, 11A-11D, 12A-12D, and 13A-13D show various embodiments of pizza ovens in which at least one of the features or components described herein may be incorporated in accordance with at least one possible embodiment.
Figure 8B:
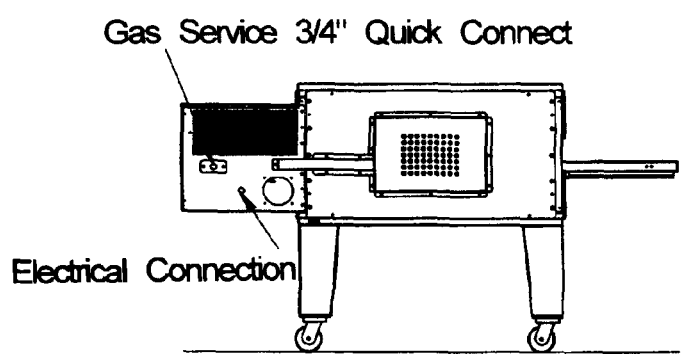
Figure 8C:
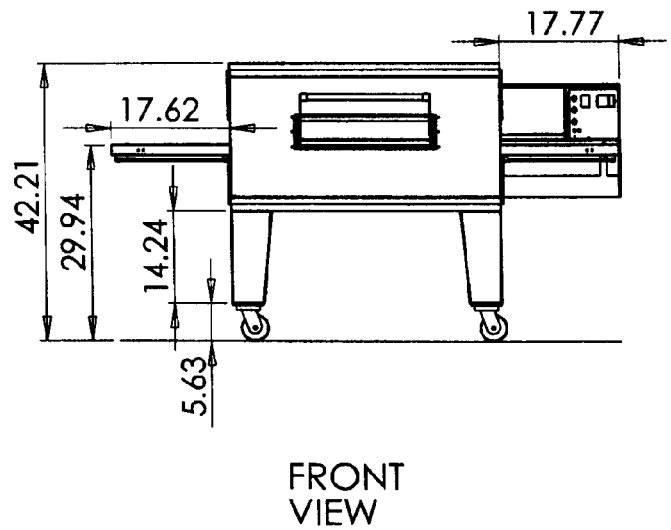
Figure 8D:
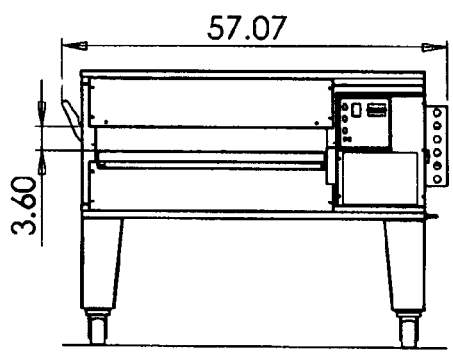
Figure 9A:
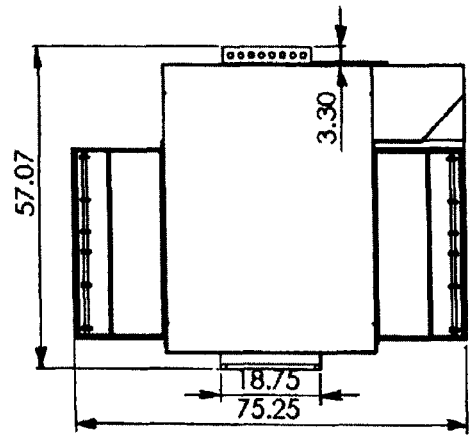
Figure 9B:
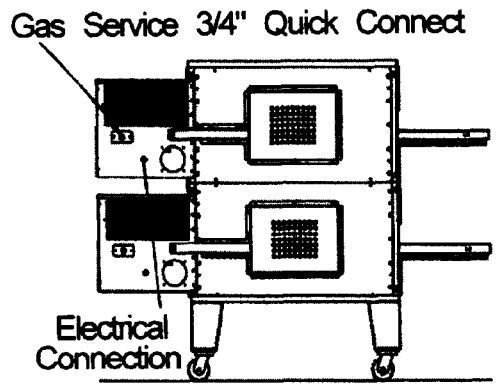
Figure 9C:
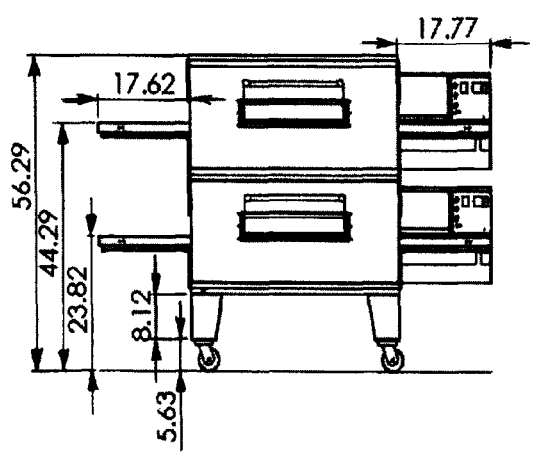
Figure 9D:
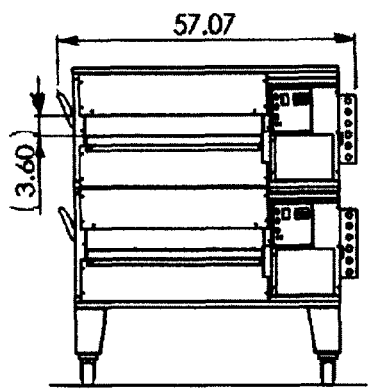
Figure 10A:
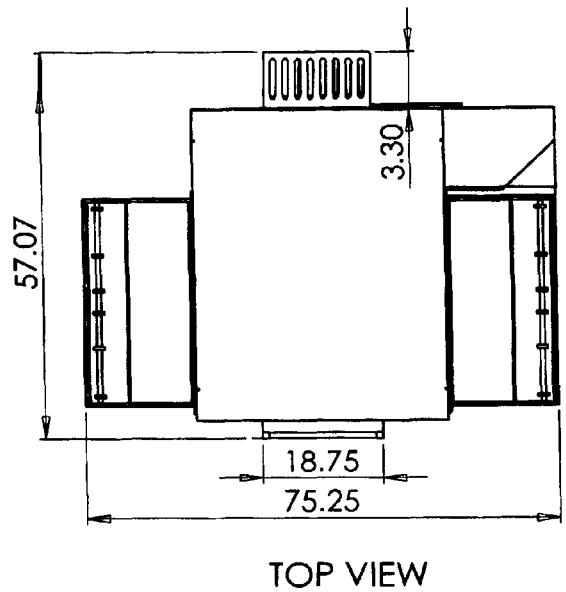
Figure 10B:
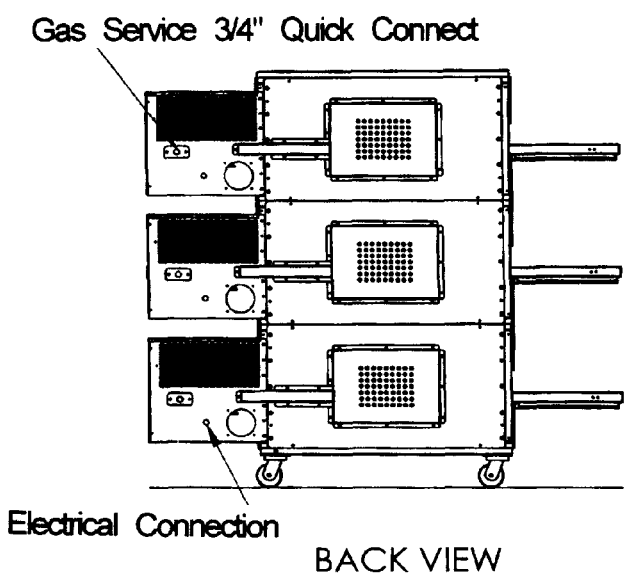
Figure 10C:
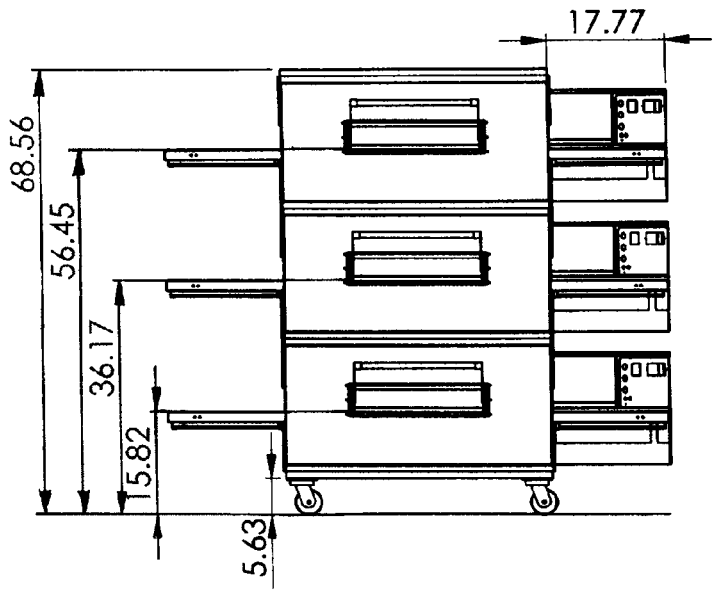
Figure 10D:
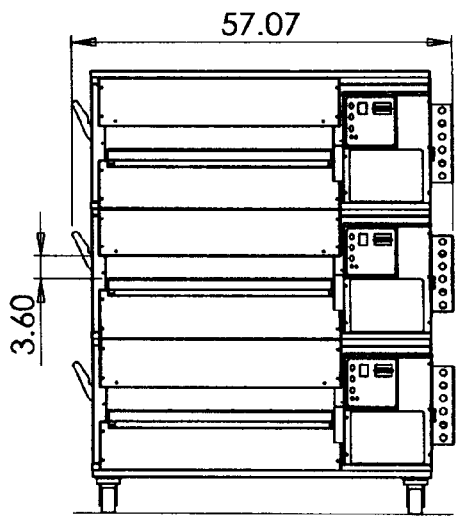
Figure 11A:
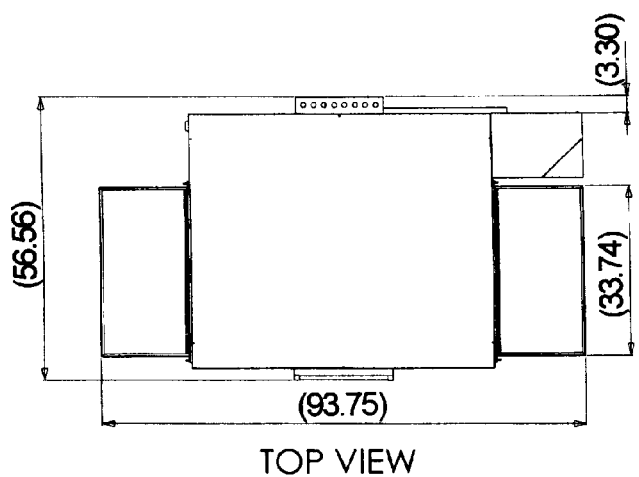
Figure 11B:
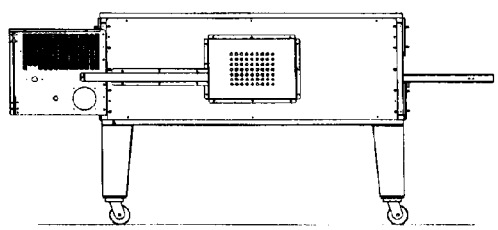
Figure 11C:
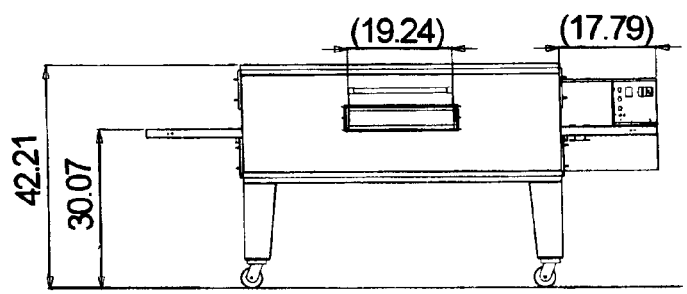
Figure 11D:
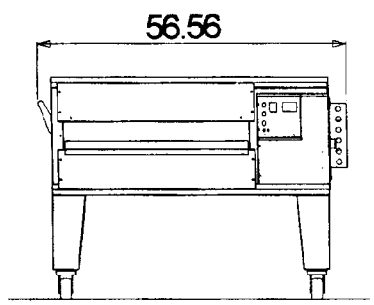
Figure 12A:
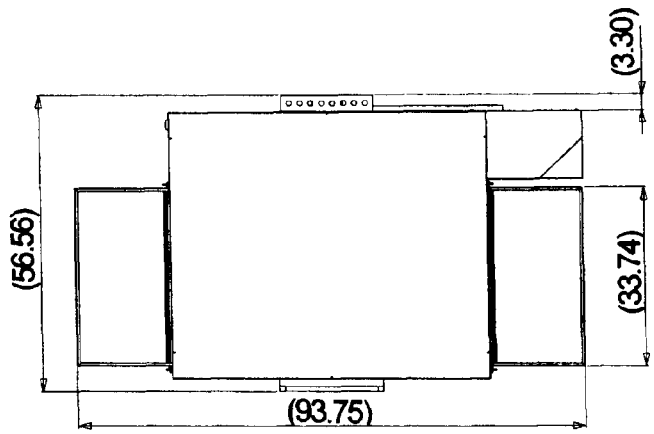
Figure 12B:
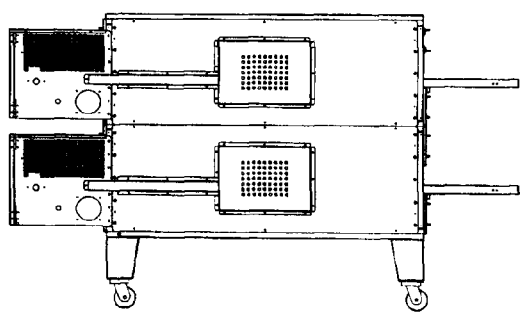
Figure 12C:
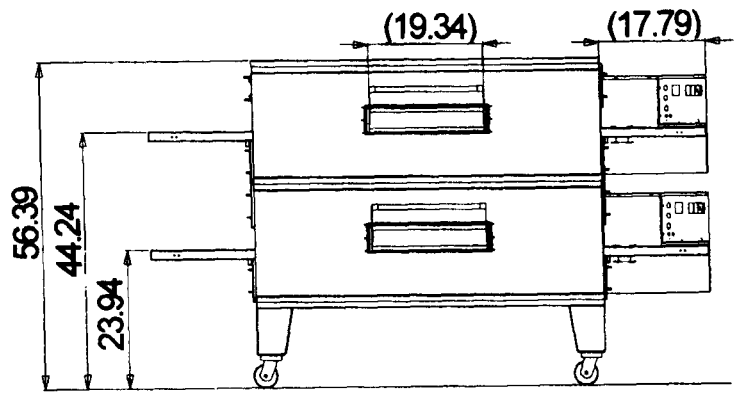
Figure 12D:
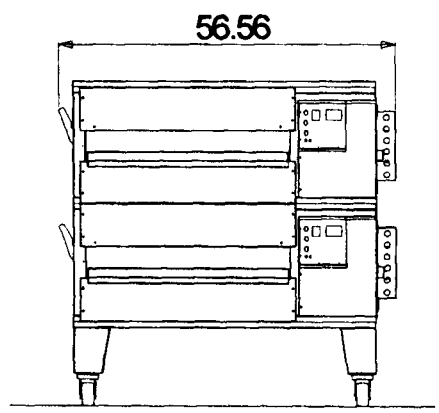
Figure 13A:
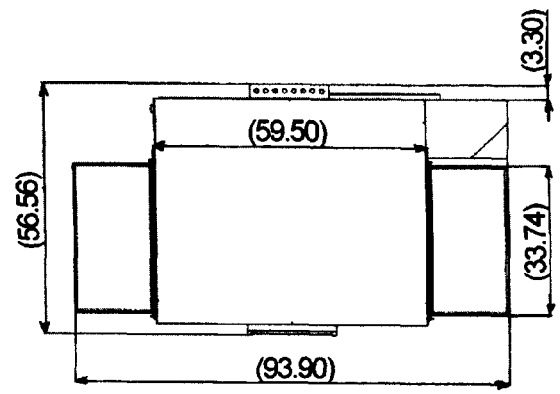
Figure 13B:
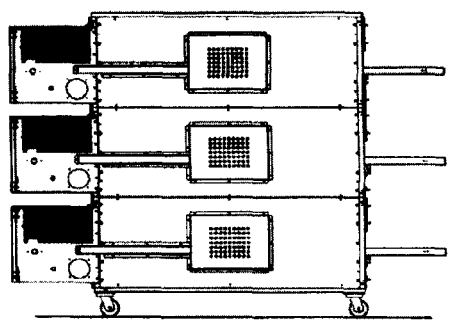
Figure 13C:
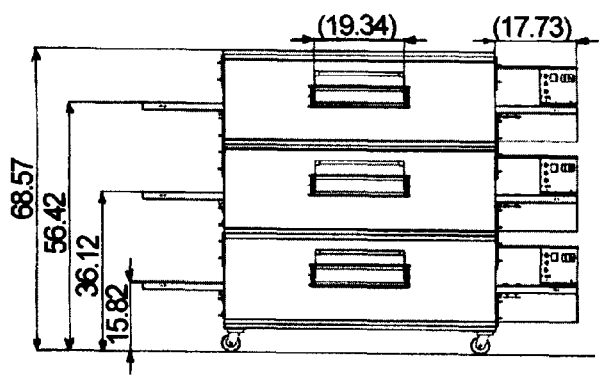
Figure 13D:
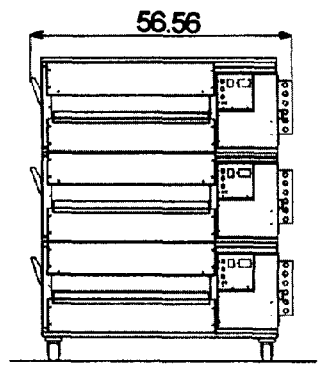

FIG. 7 shows schematically the components of a two-speed control arrangement which permits two-speed baking at a high and a low air flow setting in accordance with at least one possible embodiment. FIG. 7 shows a control 200 which displays the length of time for baking at a particular speed. There are two conveyor belt speed adjustment controls, namely a speed-increasing control 201 and a speed-decreasing control 203. There is also a toggle 202 which toggles between two different conveyor speeds. The control 200 is operatively connected to a conveyor motor 204, a burner assembly 205, and a blower fan motor 207, which is connected to a fan 206. The conveyor motor 204 drives the conveyor belt at a selected speed. The burner assembly 205 is used to increase or decrease the amount of gas and combustion air to change the BTUs. The blower fan motor 207 increases or decreases the RPMs of the oven fan.

In accordance with at least one possible embodiment, the control 200 is preset to operate the pizza oven and the components thereof at a "high" baking setting and a "low" baking setting. According to at least one possible embodiment, the high baking setting utilizes approximately 55,000 BTUs and can bake a product, such as a pizza, in approximately four minutes, while the low baking setting utilizes approximately 30,000 BTUs and can bake product, such as a pizza, in approximately seven minutes. The control 200 therefore coordinates the operation of the conveyor motor 204, burner assembly 205, and the blower fan motor 207 in accordance with the high baking setting and the low baking setting.

Upon installation of the pizza oven, the customer or installer adjusts the conveyor belt speed in relation to the high baking setting to achieve desired baking of a product at that speed and setting. The customer or installer then adjusts the conveyor belt speed in relation to the low baking setting to achieve desired baking of a product at that speed and setting. Once the speeds have been established for the conveyor belt, the customer need only press the toggle switch 202 to switch between baking settings. Once the toggle switch 202 is pressed, the control 200 sends out signals to adjust the speed of the conveyor motor 204, the BTU output of the burner assembly 205, and the speed of the blower fan motor 207 to the levels which correspond to the baking setting. For example, if high-speed or high-energy baking is selected, such as during peak business hours, the control 200 sends out signals to increase the BTU output of the burner assembly 205, as well as the speed of the blower fan motor 207 and conveyor motor 204. Then, if the operator desires to switch to low-speed or low-energy baking, such as during off-peak business hours, the toggle switch 202 may be pressed and the control 200 sends out signals to decrease the BTU output of the burner assembly 205, as well as the speed of the blower fan motor 207 and the conveyor motor 204. In addition, should the customer determine after installation and setting of the conveyor speeds that a higher or lower conveyor speed is desired for either the high baking setting or low baking setting, the customer may adjust the speed of the conveyor using the control to set a new conveyor speed. Such adjustability will result in energy savings, and thus cost savings, for the operator or owner of the pizza oven.

FIGS. 8A-8D, 9A-9D, 10A-10D, 11A-11D, 12A-12D, and 13A-13D show various embodiments of pizza ovens in which at least one of the above-described features or components may be incorporated in accordance with at least one possible embodiment. Specifically, FIGS. 8A-8D and 11A-11D show a single pizza oven, FIGS. 9A-9D and 12A-12D show a double-stacked pizza oven, and FIGS. 10A-10D and 13A-13D show a triple-stacked pizza oven.

At least one possible embodiment of a pizza oven and components therefore is disclosed in the "Installation and Operating Manual" for the EDGE MODELS: EDGE40/EDGE60, Revision 1.1, published Dec. 4, 2008, by MF&B Restaurant Systems, Inc., 133 ICMI Road, Dunbar, Pa. 15431, which publication is incorporated by reference as if set forth in its entirety herein.

One feature or aspect of an embodiment is believed at the time of the filing of this patent application to possibly reside broadly in a modular pizza oven kit comprising: a plurality of pizza oven components comprising: a base panel; a plurality of casters being configured to be detachably connected to said base panel to support said base panel on a floor surface; a top panel being configured to be disposed to form a top of a bake chamber; a bottom panel being configured to be disposed to form a bottom of a bake chamber opposite said top panel; a side panel being configured to be disposed to form a first side of a bake chamber; a plenum arrangement being configured to be disposed to form a second side of a bake chamber opposite said first side; said plenum arrangement comprising a housing and a hot air blower motor and fan being disposed in said housing; said top panel, said bottom panel, said first side panel, and said plenum arrangement being configured to be detachably connected together to form an open-ended bake chamber; said bake chamber being configured to be detachably connected to and supported on said base panel; a conveyor belt being configured to be detachably connected inside said bake chamber with first and second end portions of said conveyor belt projecting out of the open ends of said bake chamber; a plurality of finger assemblies being configured to be detachably connected inside the bake chamber and to direct heated air toward a product to be baked on said conveyor belt; two top end panels being configured to be detachably connected to said side panel and said plenum arrangement to close the upper portion of the open ends of said bake chamber above said conveyor belt; two bottom end panels being configured to be detachably connected to said side panel and said plenum arrangement to close the lower portion of the open ends of said bake chamber the low said conveyor belt; a control can assembly being configured to be detachably connected to at least said plenum arrangement; a conveyor motor being configured to drive said conveyor; a burner assembly being configured to heat air; each of said conveyor motor and said burner assembly being disposed in said control can assembly; and said control can assembly being configured to control the operation of said conveyor motor, said burner assembly, and said hot air blower motor and fan; a plurality of fastening devices comprising at least one of bolts and screws being configured to detachably connect pizza oven components; and a plurality of alignment pins being configured to temporarily connect and align pizza oven components to permit accurate connection of pizza oven components with said fastening devices.

Another feature or aspect of an embodiment is believed at the time of the filing of this patent application to possibly reside broadly in a pizza oven finger assembly being configured to be connected to a hole in a plenum of a pizza oven to receive and guide heated air from the plenum toward a product to be baked in a pizza oven, said finger assembly comprising: a housing comprising a first side portion, a second side portion, and a third side portion, said first side portion being disposed to connect said second side portion and said third side portion; each of said second and third side portions being disposed perpendicular to said first side portion; an outer cover panel being matingly and sealingly engaged with said housing; an inner panel being disposed between said housing and said outer cover panel; each of said outer cover panel and said inner panel having holes disposed therein to guide heated air there through; a finger holder being configured to be fastened to a side wall of a pizza oven opposite a plenum of a pizza oven; said finger holder comprising: two arm sections; a support section being disposed perpendicular to and to connect said arm sections; and a flange section being disposed to project from said support section at an angle greater than 90°; and said flange section being configured to produce, upon installation of said pizza oven finger assembly in a pizza oven, a biasing or pressing force on at least one of said outer cover panel and said housing to press and hold at least one of said outer cover panel in said housing sealingly against a plenum wall of a pizza oven to minimize leakage of heated air through a gap between the plenum wall and said pizza oven finger assembly.

Yet another feature or aspect of an embodiment is believed at the time of the filing of this patent application to possibly reside broadly in a two-speed pizza oven comprising: a base support; a top panel being disposed to form a top of a bake chamber; a bottom panel being disposed to form a bottom of a bake chamber opposite said top panel; a side panel being disposed to form a first side of a bake chamber; a plenum arrangement being disposed to form a second side of a bake chamber opposite said first side; said plenum arrangement comprising a housing and a hot air blower motor and fan being disposed in said housing; said top panel, said bottom panel, said first side panel, and said plenum arrangement being configured to be connected together to form an open-ended bake chamber; said bake chamber being configured to be connected to and supported on said base panel; a conveyor belt being configured to be connected inside said bake chamber with first and second end portions of said conveyor belt projecting out of the open ends of said bake chamber; a plurality of finger assemblies being connected inside the bake chamber and being configured to direct heated air toward a product to be baked on said conveyor belt; two top end panels being detachably connected to said side panel and said plenum arrangement to close the upper portion of the open ends of said bake chamber above said conveyor belt; two bottom end panels being detachably connected to said side panel and said plenum arrangement to close the lower portion of the open ends of said bake chamber the low said conveyor belt; a control can assembly being connected to at least said plenum arrangement; a conveyor motor being configured to drive said conveyor; a burner assembly being configured to heat air; each of said conveyor motor and said burner assembly being disposed in said control can assembly; said control can assembly being configured to control the operation of said conveyor motor, said burner assembly, and said hot air blower motor and fan; said control can assembly comprising a control arrangement being configured to: switch the speed of said conveyor motor between at least a first speed and a second speed lower than said first speed; switch the output of said burner assembly between at least a first heating level and a second heating level lower than said first heating level; and switch the speed of said blower motor between at least a first speed and a second speed lower than said first speed.

A further feature or aspect of an embodiment is believed at the time of the filing of this patent application to possibly reside broadly in a method of operating a two-speed pizza oven, said method comprising the steps of: baking a first product at a first pizza oven energy level, said step of baking the first product comprising: moving a conveyor at a first conveyor speed; heating air with a burner assembly at a first heating level; and blowing heated air at a first air speed with a fan rotating at a first rotational speed; choosing to bake a second product at a second pizza oven energy level different from the first pizza oven energy level; pressing a toggle switch on a control system and sending out control signals from said control system to bake a second product at a second pizza oven energy level different from the first pizza oven energy level; baking a second product at a second pizza oven energy level different from the first pizza oven energy level, said step of baking the second product comprising: switching the operating speed of the conveyor motor to move the conveyor at a second conveyor speed different from said first conveyor speed; switching the operating level of the burner assembly to heat air at a second heating level different from said first heating level; and switching the operating speed of a fan motor to rotate the fan at a second rotational speed different from said first rotational speed to blow heated air at a second air speed different from said first air speed.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that any or all the examples of patents, published patent applications, and other documents which are included in this application and including those which are referred to in paragraphs which state "Some examples of . . . which may possibly be used in at least one possible embodiment of the present application . . . " may possibly not be used or useable in any one or more or any embodiments of the application.

The sentence immediately above relates to patents, published patent applications and other documents either incorporated by reference or not incorporated by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A modular pizza oven kit comprising:
   a plurality of pizza oven components comprising:
      a base panel;
      a plurality of casters being configured to be detachably connected to said base panel to support said base panel on a floor surface;
      a top panel being configured to be disposed to form a top of a bake chamber;
      a bottom panel being configured to be disposed to form a bottom of a bake chamber opposite said top panel;
      a side panel being configured to be disposed to form a first side of a bake chamber;
      a plenum arrangement being configured to be disposed to form a second side of a bake chamber opposite said first side;
      said plenum arrangement comprising a housing and a hot air blower motor and fan being disposed in said housing;
      said top panel, said bottom panel, said first side panel, and said plenum arrangement being configured to be detachably connected together to form an open-ended bake chamber;
      said bake chamber being configured to be detachably connected to and supported on said base panel;
      a conveyor belt being configured to be detachably connected inside said bake chamber with first and second end portions of said conveyor belt projecting out of the open ends of said bake chamber;
      a plurality of finger assemblies being configured to be detachably connected inside the bake chamber and to direct heated air toward a product to be baked on said conveyor belt;
      two top end panels being configured to be detachably connected to said side panel and said plenum arrangement to close the upper portion of the open ends of said bake chamber above said conveyor belt;
      two bottom end panels being configured to be detachably connected to said side panel and said plenum arrangement to close the lower portion of the open ends of said bake chamber the low said conveyor belt;
      a control can assembly being configured to be detachably connected to at least said plenum arrangement;
      a conveyor motor being configured to drive said conveyor;
      a burner assembly being configured to heat air;
      each of said conveyor motor and said burner assembly being disposed in said control can assembly; and
      said control can assembly being configured to control the operation of said conveyor motor, said burner assembly, and said hot air blower motor and fan;
      a plurality of fastening devices comprising at least one of bolts and screws being configured to detachably connect pizza oven components; and
      a plurality of alignment pins being configured to temporarily connect and align pizza oven components to permit accurate connection of pizza oven components with said fastening devices.

2. A pizza oven finger assembly being configured to be connected to a hole in a plenum of a pizza oven to receive and guide heated air from the plenum toward a product to be baked in a pizza oven, said finger assembly comprising:
   a housing comprising a first side portion, a second side portion, and a third side portion, said first side portion being disposed to connect said second side portion and said third side portion;
   each of said second and third side portions being disposed perpendicular to said first side portion;
   an outer cover panel being matingly and sealingly engaged with said housing;
   an inner panel being disposed between said housing and said outer cover panel;
   each of said outer cover panel and said inner panel having holes disposed therein to guide heated air there through;
   a finger holder being configured to be fastened to a side wall of a pizza oven opposite a plenum of a pizza oven;
   said finger holder comprising:
      two arm sections;
      a support section being disposed perpendicular to and to connect said arm sections; and a flange section being disposed to project from said support section at an angle greater than 90°; and said flange section being configured to produce, upon installation of said pizza oven finger assembly in a pizza oven, a biasing or pressing force on at least one of said outer cover panel and said housing to press and hold at least one of said outer cover panel in said housing sealingly against a plenum wall of a pizza oven to minimize leakage of heated air through a gap between the plenum wall and said pizza oven finger assembly.

3. A two-speed pizza oven comprising:

a base support;

a top panel being disposed to form a top of a bake chamber;

a bottom panel being disposed to form a bottom of a bake chamber opposite said top panel;

a side panel being disposed to form a first side of a bake chamber;

a plenum arrangement being disposed to form a second side of a bake chamber opposite said first side;

said plenum arrangement comprising a housing and a hot air blower motor and fan being disposed in said housing;

said top panel, said bottom panel, said first side panel, and said plenum arrangement being configured to be connected together to form an open-ended bake chamber;

said bake chamber being configured to be connected to and supported on said base panel;

a conveyor belt being configured to be connected inside said bake chamber with first and second end portions of said conveyor belt projecting out of the open ends of said bake chamber;

a plurality of finger assemblies being connected inside the bake chamber and being configured to direct heated air toward a product to be baked on said conveyor belt;

two top end panels being detachably connected to said side panel and said plenum arrangement to close the upper portion of the open ends of said bake chamber above said conveyor belt;

two bottom end panels being detachably connected to said side panel and said plenum arrangement to close the lower portion of the open ends of said bake chamber the low said conveyor belt;

a control can assembly being connected to at least said plenum arrangement;

a conveyor motor being configured to drive said conveyor;

a burner assembly being configured to heat air;

each of said conveyor motor and said burner assembly being disposed in said control can assembly;

said control can assembly being configured to control the operation of said conveyor motor, said burner assembly, and said hot air blower motor and fan;

said control can assembly comprising a control arrangement being configured to:
  switch the speed of said conveyor motor between at least a first speed and a second speed lower than said first speed;
  switch the output of said burner assembly between at least a first heating level and a second heating level lower than said first heating level; and
  switch the speed of said blower motor between at least a first speed and a second speed lower than said first speed.

4. A method of operating a two-speed pizza oven according to claim 3, said method comprising the steps of:

baking a first product at a first pizza oven energy level, said step of baking the first product comprising:
  moving a conveyor at a first conveyor speed;
  heating air with a burner assembly at a first heating level; and
  blowing heated air at a first air speed with a fan rotating at a first rotational speed;

choosing to bake a second product at a second pizza oven energy level different from the first pizza oven energy level;

pressing a toggle switch on a control system and sending out control signals from said control system to bake a second product at a second pizza oven energy level different from the first pizza oven energy level;

baking a second product at a second pizza oven energy level different from the first pizza oven energy level, said step of baking the second product comprising:
  switching the operating speed of the conveyor motor to move the conveyor at a second conveyor speed different from said first conveyor speed;
  switching the operating level of the burner assembly to heat air at a second heating level different from said first heating level; and
  switching the operating speed of a fan motor to rotate the fan at a second rotational speed different from said first rotational speed to blow heated air at a second air speed different from said first air speed.

* * * * *